Aug. 16, 1960 E. P. ZIMMERMANN 2,949,547
DELAY TIMER
Filed June 13, 1958

INVENTOR
E. P. ZIMMERMANN
BY
S. E. Hollander
ATTORNEY 2,949,547

DELAY TIMER

Elwood P. Zimmermann, East Rutherford, N.J., assignor to Bell Telephone Laboratories, Incorporated, New York, N.Y., a corporation of New York Filed June 13, 1958, Ser. No. 741,890
17 Claims. (Cl. 307—88.5)

This invention relates to time delay circuits and more particularly to transistor timers which produce a control signal after a predetermined interval.

Known time delay circuits often exhibit characteristic restrictions in their operating behavior. For example, where the rate of charge on a capacitor is used as an element in the timing mechanism, the over-all time delay changes in accordance with minor variations in applied operating potentials. Moreover, the time required to discharge the capacitor is a factor in establishing an arbitrary upper boundary for the pulse repetition frequency to which the timer may respond. The critical nature of these factors is magnified in those instances where very short time delays, i.e., in the microsecond range, are required.

An object of this invention is to provide means for producing an output control signal upon the lapse of a predetermined time interval.

An additional object of this invention is to provide for automatic reset, and measurement of a new time interval, upon reception of a control signal.

A further object is to generate a delay which is substantially independent of the voltage conditions of bistable circuits associated therewith.

Still another object of this invention is to provide a highly stable predetermined delay period.

A further object of this invention is to provide a low recovery time between measured delay intervals.

These and other objects of the invention may be realized in one illustrative embodiment wherein a bistable or flip-flop circuit is connected to a transistor gate. The output of the gate feeds a regenerative pulser through a resistance-capacitance delay network. In the quiescent condition, the gate circuit is energized and the timer capacitor remains discharged. When the flip-flop circuit is operated to change state, the gate circuit is deenergized and the capacitor begins to charge. After a predetermined time interval, the capacitor charges to a voltage sufficient to operate the regenerative pulser which produces an output pulse and also resets the flip-flop and gate circuits to the original condition. When the gate circuit is again energized, it provides a low impedance discharge path for a portion of the charge on the timer capacitor, the remaining charge being dissipated through a condenser connected to the pulser.

In accordance with one aspect of my invention the output pulse is generated by a regenerative transistor pulser having a feedback circuit including a feedback capacitor. The transistor pulser serves both to provide the output pulse and also to reset the gate circuit to provide a discharge path for the timing capacitor. The discharge of the timing capacitor, however, is further facilitated and hastened by the feedback capacitor of the transistor pulser. When the transistor of the pulser circuit is returned to its high impedance non-conducting state, the feedback capacitor is effectively placed in series with the timing capacitor and provides an additional path for the rapid discharge of the timing capacitor; this is further effected because the charges on the timing and feedback capacitors are of opposite polarity when the transistor pulser returns to its non-conducting state.

It is a feature of this invention that a delay network include a timing capacitor and a second capacitor each having a transistor associated therewith, the timing capacitor being discharged through a first path in response to its associated transistor's impedance condition and through a second path including the second capacitor in response to its associated transistor's impedance condition.

It is another feature of this invention that the timing capacitor be charged through a first path including an impedance element, be partially discharged through an asymmetrically conducting device shunting that impedance element and through its associated transistor, and be further discharged through the second capacitor.

It is a further feature of this invention that an output pulse generator be enabled in response to charging of the timing capacitor and that the pulse generator include a transistor and a feedback loop for the transistor including the second capacitor. Further, in accordance with this feature of my invention, upon restoring of the transistor to its high impedance state, the charge on the second capacitor in the feedback path is of opposite polarity to the charge remaining on the timing capacitor, the two capacitors at this time being effectively connected in series by the circuit.

It is still a further feature of my invention that a bistable circuit be used in conjunction with the transistor gating circuit and timing capacitor associated therewith to initiate operation of the gating circuit and timing capacitor. Further in accordance with this feature of my invention the bistable circuit is set on application thereto of an external pulse to be delayed and reset by operation of the output transistor pulser.

A complete understanding of this invention and of these and other desirable features thereof may be gained from consideration of the following detailed description and the accompanying drawing, in which.

Figure 1:
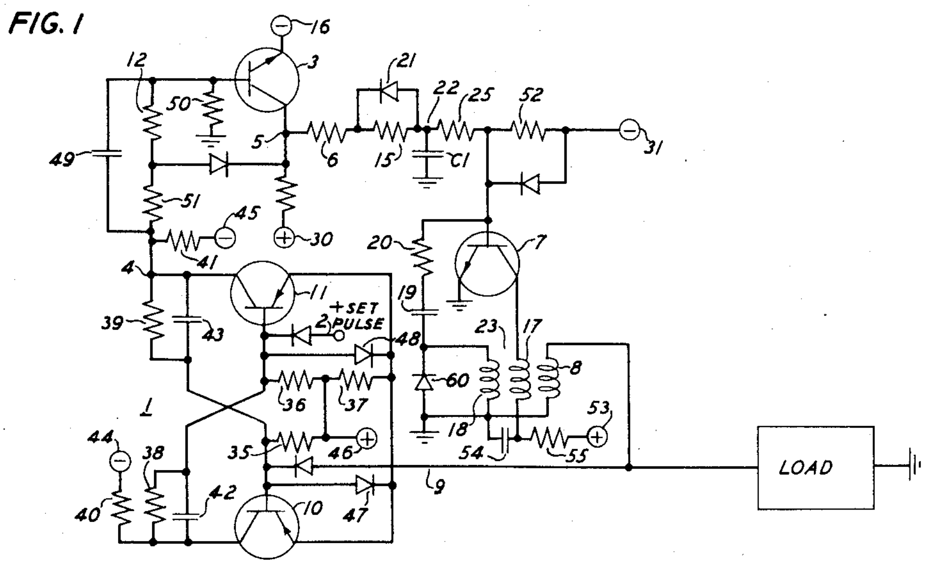
Fig. 1 is a schematic illustration of one embodiment of the invention illustrating the delay timer with regenerative pulser output and automatic reset.

Referring now to Fig. 1, an illustrative embodiment of the invention is shown. A bistable or flip-flop circuit 1 is responsive to positive input or set pulses over lead 2. Connected to one output 4 of the symmetrical flip-flop 1 is a gate amplifier including a transistor 3 which is energized or in the low impedance state when terminal 4 of the flip-flop is in the positive voltage condition. The collector electrode 5 of transistor 3 is connected through resistances 6, 15 and 25 to the base electrode of transistor 7. Diodes 47 and 48 are advantageously connected between the emitter and base of transistors 10 and 11, respectively, of the flip-flop to limit the bias voltage from emitter to base to the forward voltage drop of the diode when the transistors are in the "off" or high impedance state, thus improving triggering sensitivity.

Connected between ground and the path between the collector electrode of gating transistor 3 and the base electrode of output pulser transistor 7 is a timing capacitor C1. Specifically, capacitor C1 is connected to the junction of the resistors 15 and 25 at terminal 22. A diode or asymmetrically conducting element 21 is connected across the resistor 15 so that the charging path for the capacitor C1 is through the resistor 15 but one discharging path for the capacitor C1 is through the diode 21.

Transistor 7 is the active element of a regenerative pulser, the output winding 8 of which is coupled to a load, shown symbolically. In addition, the output winding is connected over conductor 9 to the base electrode of transistor 10 of the flip-flop to reset the flip-flop. Further, the output pulse transformer 23, in addition to output winding 8, also includes a primary winding 17 connected to the collector of transistor 7 and a feedback winding 18 having a diode 60 in shunt across it. Connected in the feedback path to the base of the transistor 7 are also a feedback capacitor 19 and resistor 20.

In the quiescent condition of the circuit, transistor 11 of the flip-flop is in the conducting or low impedance state. Thus, a positive voltage condition appears on terminal 4 of the flip-flop. This potential may be traced over resistors 51 and 12 to the base electrode of transistor 3 biasing the transistor in the "on" or low impedance state. Capacitor C1 remains discharged to a negative voltage approximating that of potential source 16.

This negative voltage, applied to the base electrode of transistor 7 over resistance 25, biases transistor 7 in the "off" or high impedance state.

To operate the delay timer, a positive signal pulse is applied over conductor 2 to the base electrode of transistor 11. This results in reverse biasing the base-emitter junction of transistor 11 and transfers transistor 11 to the "off" state. Transistor 10, which previously was nonconducting, shifts to the "on" state in accordance with well-known flip-flop operation.

When transistor 11 is shifted to the "off" state, terminal 4 experiences a potential excursion in the negative direction. This negative voltage swing reverse-biases the base-emitter junction of transistor 3 to shift that transistor to the non-conducting condition. Terminal 5, at the collector of transistor 3, goes from a negative potential approximating that of source 16 to a positive potential approaching that of source 30. As a consequence, capacitor C1 begins to charge over resistors 6 and 15 in accordance with the changed potential conditions of terminal 5.

When the voltage on capacitor C1 reaches ground or goes positive, the base-emitter junction of transistor 7 is forward-biased over resistance 25 and transistor 7 enters the low impedance state. Variations in collector current flowing through primary winding 17 are reflected back through feedback winding 18, feedback capacitor 19, resistance 20 and the base electrode of transistor 7 to produce regeneration. When feedback capacitor 19 charges to a sufficient potential level further flow of current through the feedback path is blocked.

Current through primary winding 17 is also coupled through output winding 8 to provide a positive current pulse to the load circuit and to the base electrode of transistor 10 over conductor 9. This pulse over conductor 9 shifts transistor 10 to the high impedance state and transistor 11 to the low impedance condition. Transistor 3, which now experiences a positive potential on its base electrode, is transferred to the conducting condition. Capacitor C1 discharges from the potential previously acquired over a circuit including diode 21, resistance 6, the collector-emitter junction of transistor 3 and potential source 16. Additionally, a portion of the charge on capacitor C1 is also dissipated through resistances 25, 20 and capacitor 19. Thus, the initial delay timer conditions have been restored and the circuit is in readiness for the next signal pulse over lead 2.

For purposes of illustration, the circuit parameters may assume the following values:

Resistance (ohms):

| | |
|---|---|
| 12 | 360 |
| 20 | 100 |
| 25 | 200 |
| 35 | 2,610 |
| 36 | 2,610 |
| 37 | 825 |
| 38 | 3,160 |
| 39 | 3,160 |
| 40 | 3,160 |
| 41 | 3,160 |
| 50 | 2,610 |
| 51 | 300 |
| 52 | 20,000 |
| 55 | 100 |

Capacitance (microfarads):

| | |
|---|---|
| 19 | $6800\times10^{-6}$ |
| 42 | $270\times10^{-6}$ |
| 43 | $270\times10^{-6}$ |
| 49 | $1500\times10^{-6}$ |
| 54 | 5.0 |

Potentials (volts):

| | |
|---|---|
| 16 | −1.5 |
| 30 | +14 |
| 31 | 4.5 |
| 44 | −16 |
| 45 | −16 |
| 46 | +16 |
| 53 | +14 |

All diodes are Hughes IN–463 or equivalent. All transistors are Raytheon CN–721 or equivalent.

Figure 2:
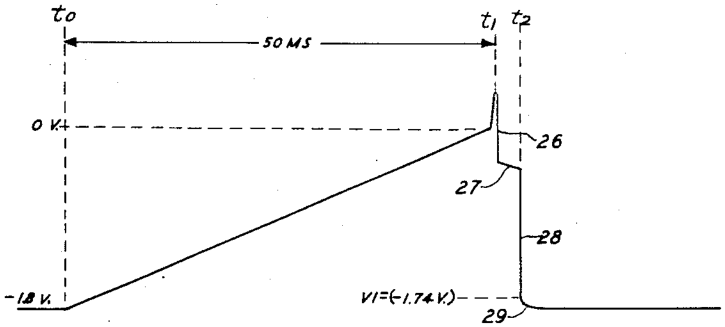
Fig. 2 illustrates the voltage waveforms at terminal 22 of Fig. 1 during the circuit operation.

Fig. 2 indicates the voltage waveforms at terminal 22 when resistance 15 is 5,000 ohms, capacitor C1 is 0.04 microfarad, and the remaining circuit parameters are as indicated above. In the quiescent condition of the circuit, terminal 22 is at a potential of substantially −1.8 volts. When a signal input pulse is applied to conductor 2 at time $t_0$, the voltage at terminal 5 is switched to 14 volts and capacitor C1 charges in a positive voltage direction. At time $t_1$, after the lapse of 50 microseconds, transistor 7 is driven into conduction and the regenerative pulser operates. The pulser has an output during the interval $(t_2-t_1)$.

The sharp rise at $t_1$ is produced by regenerative action of transistor 7, coupled over resistance 25.

At time $t_1$ plus approximately one microsecond, flip-flop 1 and transistor 3 have already changed state, as explained above, and capacitor C1 begins to discharge along line 26 over a path including diode 21, resistor 6 and the collector-emitter circuit of transistor 3.

When the capacitor C1 discharges to a potential that does not exceed the forward voltage drop of diode 21, the discharge path, traced above, shifts from diode 21 to resistor 15 and the discharge characteristic is as shown in line 27.

At time $t_2$, transistor 7 is biased to cut-off and the feedback capacitor 19 is effectively placed in series with the timing capacitor C1 and feedback capacitor 19 begins to discharge. Because the charges remaining on these two capacitors are of opposite polarity in this series path the further discharge of capacitor C1, in accordance with an aspect of my invention, is very rapid, as illustrated by curve 28. When terminal 22 assumes a voltage equal to minus 1.74 volts, both capacitors C1 and 19 discharge to the base bias supply 31 along curve 29.

Capacitor C1 assumes a voltage at time $t_2$ which may be expressed as:

$$V1=\frac{V2CB}{CA+CB}$$

where

V1=voltage of C1
V2=voltage of capacitor 19
CA=capacitance of capacitor C1
CB=capacitance of capacitor 19 thus:

$$V1=\frac{12V\times0.0068\ \mu f.}{0.04\ \mu f.+0.0068\ \mu f.}$$

V1=1.74 volts.

To minimize restoration time of the delay timer, the values of capacitance should be chosen so that V1 is substantially equal to the quiescent voltage at terminal 22. As seen in Fig. 2, V1 is 1.74 volts or approximately equal to the quiescent voltage of −1.8 volts.

Figure 3:
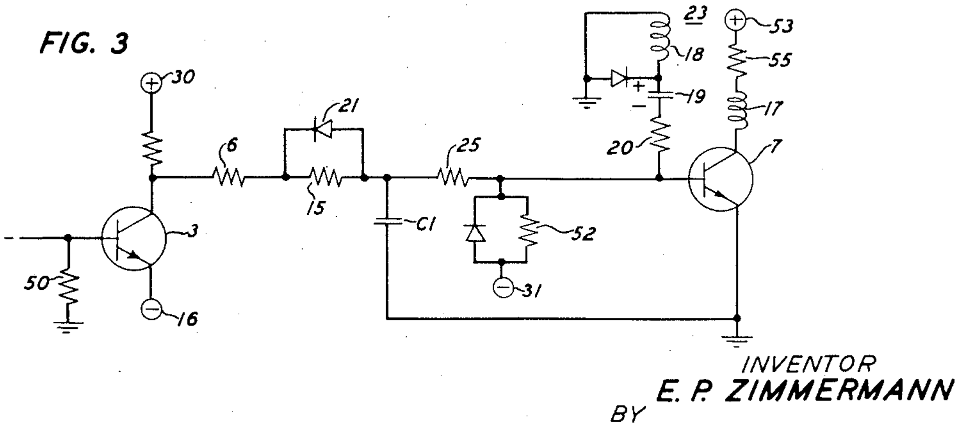
Fig. 3 is a simplified schematic circuit showing a portion of the discharge path of the timer capacitor.

Fig. 3 is a simplified schematic which clearly depicts the series discharge path of condensers C1 and 19 at time $t_2$, referred to above.

At this time, pulse transformer 23 (shown in part) has saturated and capacitor 19 has charged to a value of substantially 12 volts in the polarity shown. Since transistor 7 is in a high impedance state, the only discharge path for capacitor 19 is through resistances 20, 25 and condenser C1. The discharge of capacitor 19 effectuates the rapid discharge of the oppositely polarized condenser C1.

It may be seen from the circuit configuration of Fig. 1 that variations in the voltage output of flip-flop 1 have no substantial effect on the charge time of the resistance-capacitance network including resistor 15 and capacitor C1 in consequence of the interposition of transistor 3.

It is understood that the embodiment shown and the parameter values illustrated are merely exemplary and that variations and modifications may be made by those skilled in the art without departing from the scope of the invention.

What is claimed is:

1. An electrical circuit comprising first and second transistors having base, emitter and collector electrodes, said transistors being responsive to the reception of control signals to vary from one impedance condition to another, potential supply means connected to said emitter and collector electrodes, means connecting one of said electrodes of said first transistor to one of said electrodes of said second transistor, a first capacitor connected to said one electrode of said first transistor and responsive to the transfer of said first transistor to a particular impedance condition to discharge through said first transistor, and a second capacitor connected to said one electrode of said second transistor and responsive to the transfer of said second transistor to a particular impedance condition to effect further discharge of said first capacitor through said second capacitor.

2. An electrical circuit in accordance with claim 1 further comprising a regenerative feedback path connected between another electrode of said second transistor and said one electrode and including said second capacitor.

3. An electrical circuit comprising first and second transistors having base, emitter and collector electrodes, said transistors being responsive to the reception of control signals to vary from one impedance condition to another, potential supply means connected to said emitter and collector electrodes, means including an asymmetrically conducting device connecting one of said electrodes of said first transistor to one of said electrodes of said second transistor, a first capacitor connected to said asymmetrically conducting device and responsive to the transfer of said first transistor to a particular impedance condition to discharge over a path including said first transistor and said asymmetrically conducting device, and a second capacitor connected to said one electrode of said second transistor and responsive to the transfer of said second transistor to a particular impedance condition to effect further discharge of said first capacitor through said second capacitor.

4. An electrical circuit comprising first and second transistors having base, emitter and collector electrodes, said transistors being responsive to the reception of control signals to vary from one impedance condition to another, potential supply means connected to said emitter and collector electrodes, coupling means including impedance means connecting one of said electrodes of said first transistor to one of said electrodes of said second transistor, a first capacitor connected to said impedance means, an asymmetrically conducting device connected in shunt with said impedance means, and a second capacitor connected to said one electrode of said second transistor, said first capacitor being responsive to the transfer of said first transistor to one impedance condition to charge over a path including said potential supply means and said impedance means, said first capacitor being additionally responsive to the transfer of said first transistor to another impedance condition to discharge over a path including said asymmetrically conducting device and said first transistor, said second capacitor being responsive to the transfer of said second transistor to a particular impedance condition to effect further discharge of said first capacitor through said second capacitor.

5. An electrical circuit comprising first and second transistors having base, emitter and collector electrodes, said transistors being responsive to the reception of control signals to vary from one impedance condition to another, potential supply means connected to said emitter and collector electrodes, means connecting the collector electrode of said first transistor to the base electrode of said second transistor, a first capacitor connected to said collector electrode of said first transistor and responsive to the transfer of said first transistor to a particular impedance condition to discharge through said first transistor, and a second capacitor connected to said base electrode of said second transistor and responsive to the transfer of said second transistor to a particular impedance condition to effect further discharge of said first capacitor.

6. An electrical circuit in accordance with claim 5 further comprising a load connected to said second transistor collector electrode and a feedback path connected between said second transistor collector and base electrodes and including said second capacitor.

7. An electrical circuit in accordance with claim 6 further comprising means connected to said second transistor collector electrode for determining said first transistor to be in its low impedance condition on appearance of an output pulse at said second transistor collector electrode.

8. An electrical circuit comprising first and second transistors having base, emitter and collector electrodes, said transistors being responsive to the reception of control signals to vary from one impedance condition to another, potential supply means connected to said emitter and collector electrodes, means including an asymmetrically conducting device connecting the collector electrode of said first transistor to the base electrode of said second transistor, a first capacitor connected to said asymmetrically conducting device and responsive to the transfer of said first transistor to a particular impedance condition to discharge over a path including said first transistor and said asymmetrically conducting device, and a second capacitor connected to the base electrode of said second transistor and responsive to the transfer of said second transistor to a particular impedance condition to effect further discharge of said first capacitor.

9. An electrical circuit comprising first and second transistors having base, emitter and collector electrodes, said transistors being responsive to the reception of control signals to vary from one impedance condition to another, potential supply means connected to said emitter and collector electrodes, means including impedance means connecting the collector electrode of said first transistor to the base electrode of said second transistor, a first capacitor connected to said impedance means, an asymmetrically conducting device connected in shunt with said impedance means, and a second capacitor connected to said base electrode of said second transistor, said first capacitor being responsive to the transfer of said first transistor to one impedance condition to charge over a path including said potential supply means and said impedance means, said first capacitor being additionally responsive to the transfer of said first transistor to another impedance condition to discharge over a path including said first transistor and said asymmetrically conducting device, said second capacitor being responsive to the transfer of said second transistor to a particular impedance condition to effect further discharge of said first capacitor.

10. An electrical circuit comprising first and second transistors having base, emitter and collector electrodes, means for supplying control signals to the base electrode of said first transistor, said transistors being responsive to the reception of said control signals to vary from one impedance condition to another, potential supply means connected to said emitter and collector electrodes, means connecting the collector electrode of said first transistor to the base electrode of said second transistor, a first capacitor connected to said collector electrode of said first transistor and responsive to the transfer of said first transistor to a particular impedance condition to discharge through said first transistor, and a second capacitor connected to said base electrode of said second transistor and responsive to the transfer of said second transistor to a particular impedance condition to effect further discharge therethrough of said first capacitor.

11. A delay network comprising first and second transistors having base, emitter and collector electrodes, bistable means for supplying control signals to the base electrode of said first transistor, said transistors being responsive to the reception of said control signals to vary from one impedance condition to another, potential supply means connected to said emitter and collector electrodes, means including an asymmetrically conducting device connecting the collector electrode of said first transistor to the base electrode of said second transistor, a first capacitor connected to said asymmetrically conducting device and responsive to the transfer of said first transistor to a particular impedance condition to discharge over a path including said first transistor and said asymmetrically conducting device, and a second capacitor connected to the base electrode of said second transistor and responsive to the transfer of said second transistor to a particular impedance condition to effect further discharge of said first capacitor.

12. A delay network in accordance with claim 11 further comprising a feedback path between said second transistor base electrode and another electrode of said second transistor, said second capacitor being included in said feedback path.

13. A delay network in accordance with claim 12 further comprising means for applying an input pulse to said bistable means and means connected to said second transistor another electrode for applying a reset pulse to said bistable means upon appearance of an output pulse at said second transistor another electrode.

14. A delay network comprising first and second transistors having base, emitter and collector electrodes, flipflop means for supplying control signals to said base electrode of said first transistor, said transistors being responsive to the reception of control signals to vary from one impedance condition to another, potential supply means connected to said emitter and collector electrodes, means including impedance means connecting the collector electrode of said first transistor to the base electrode of said second transistor, a first capacitor connected to said impedance means, an asymmetrically conducting device connected in shunt with said impedance means, and a second capacitor connected to said base electrode of said second transistor, said first capacitor being responsive to the transfer of said first transistor to one impedance condition to charge over a path including said potential supply means and said impedance means, said first capacitor being additionally responsive to the transfer of said first transistor to another impedance condition to discharge over a path including said first transistor and said asymmetrically conducting device, said second capacitor being responsive to the transfer of said second transistor to a particular impedance condition to effect further discharge of said first capacitor.

15. A delay network comprising first and second transistors having base, emitter and collector electrodes, means for supplying control signals to the base electrode of said first transistor, said transistors being responsive to the reception of said control signals to vary from one impedance condition to another, potential supply means connected to said emitter and collector electrodes, means connecting the collector electrode of said first transistor to the base electrode of said second transistor, a first capacitor connected to said collector electrode of said first transistor and responsive to the transfer of said first transistor to a particular impedance condition to discharge through said first transistor, a second capacitor connected to said base electrode of said second transistor and responsive to the transfer of said second transistor to a particular impedance condition to effect further discharge of said first capacitor, and pulsing means including said second capacitor and said second transistor and connected to said first capacitor and operative to generate an output pulse in response to the charging of said first capacitor for a predetermined time interval.

16. A delay network comprising first and second transistors having base, emitter and collector electrodes, bistable means for supplying control signals to the base electrode of said first transistor, said transistors being responsive to the reception of control signals to vary from one impedance condition to another, potential supply means connected to said emitter and collector electrodes, means including an asymmetrically conducting device connecting the collector electrode of said first transistor to the base electrode of said second transistor, a first capacitor connected to said asymmetrically conducting device and responsive to the transfer of said first transistor to a particular impedance condition to discharge over a path including said first transistor and said asymmetrically conducting device, a second capacitor connected to said base electrode of said second transistor, and responsive to the transfer of said second transistor to a particular impedance condition to effect further discharge of said first capacitor, and a monostable pulser including said second capacitor and said second transistor and connected to said first capacitor and operative to generate an output pulse in response to the charging of said first capacitor for a predetermined time interval.

17. A delay network comprising first and second transistors having base, emitter and collector electrodes, flipflop means for supplying control signals to said base electrode of said first transistor, said transistors being responsive to the reception of said control signals to vary from one impedance condition to another, potential supply means connected to said emitter and collector electrodes, means including impedance means connecting the collector electrode of said first transistor to the base electrode of said second transistor, a first capacitor connected to said impedance means, an asymmetrically conducting device connected in shunt with said impedance means, a second capacitor connected to said base electrode of said second transistor, said first capacitor being responsive to the transfer of said first transistor to one impedance condition to charge over a path including said potential supply means and said impedance means, said first capacitor being additionally responsive to the transfer of said first transistor to another impedance condition to discharge over a path including said first transistor and said asymmetrically conducting device, said second capacitor being responsive to the transfer of said second transistor to a particular impedance condition to effect further discharge therethrough of said first capacitor, and blocking oscillator means connected to said first capacitor and operative to generate an output pulse in response to the charging of said first capacitor for a predetermined time interval.

References Cited in the file of this patent

UNITED STATES PATENTS

| | | |
|---|---|---|
| 2,562,188 | Hance | July 31, 1951 |
| 2,588,413 | Roschke | Mar. 11, 1952 |
| 2,735,007 | McCurdy | Feb. 14, 1956 |
| 2,831,113 | Weller | Apr. 15, 1958 |
| 2,851,632 | Janssen et al. | Sept. 9, 1958 |